Dec. 16, 1958 J. R. WALKER 2,864,489
CONVEYORS
Filed Sept. 17, 1956 3 Sheets-Sheet 1

INVENTOR
John Roland Walker
BY
ATTORNEYS

Dec. 16, 1958

J. R. WALKER 2,864,489

CONVEYORS

Filed Sept. 17, 1956

INVENTOR
John Roland Walker
BY Stevens Davis Miller & Mosher
ATTORNEYS

Dec. 16, 1958  J. R. WALKER  2,864,489
CONVEYORS
Filed Sept. 17, 1956  3 Sheets-Sheet 3
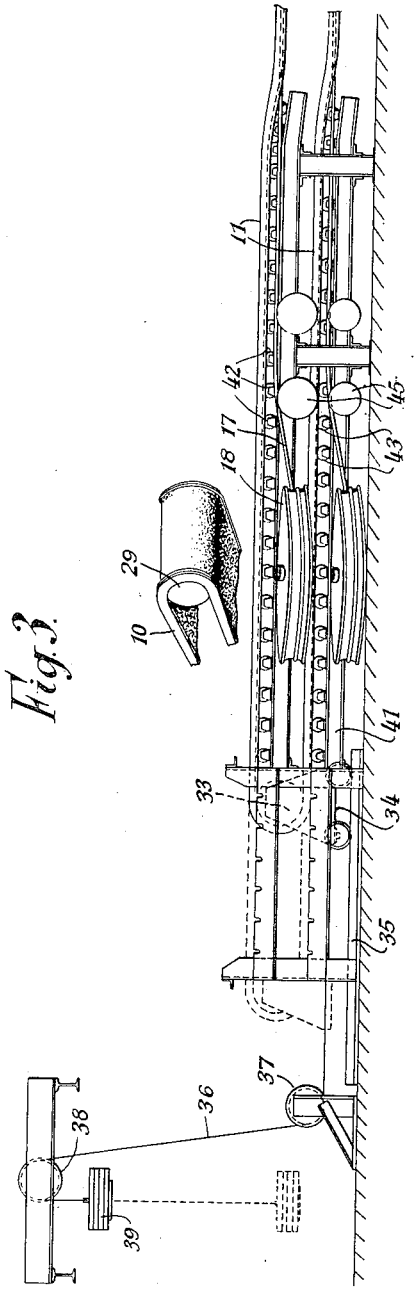
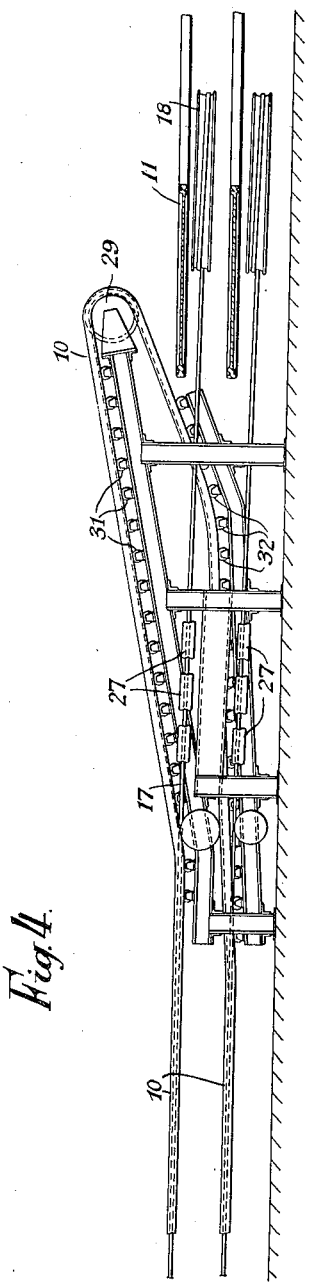
INVENTOR
John Roland Walker
BY Stevens Davis Miller + Mosher
ATTORNEYS United States Patent Office 2,864,489
Patented Dec. 16, 1958

2,864,489

CONVEYORS

John R. Walker, Inverness, Scotland, assignor to Cable Belt Limited, Inverness, Scotland Application September 17, 1956, Serial No. 610,207

Claims priority, application Great Britain October 24, 1955

3 Claims. (Cl. 198—203)

This invention relates to conveyors of the kind in which the load-carrying members are belts supported and driven by cables forming circuits one at each side of the belts.

The object of the invention is to provide a conveyor of the kind referred to for conveying material along a path including sections which lie at right angles or are inclined one to another, which does not necessitate the provision of separate driving means for each section of the conveyor.

According to the invention, in a conveyor of the kind referred to including two separate belts each constituting the load-carrying member of a section of the conveyor, the said sections having their longitudinal centre lines in vertical planes disposed at an angle one to the other, each of the cable circuits supports one side of both belts, the upper and lower runs of both cable circuits being deflected by suitable guide means so as to change their directions at the places where the belts meet.

Further, according to the invention, in a conveyor of the kind referred to including two belts having their centre lines in vertical planes disposed at an angle one to the other, means are provided at the place of meeting of the belts to deflect supporting the driving cables associated with one belt into alignment with the direction of the run of the other belt.

The cables are preferably deflected by means of bend pulleys, the bend pulleys for deflecting the runs of the cable circuit at the outside of the angle between the conveyor sections being positioned on the outer side of that circuit, the runs of that circuit being led outwardly round the said pulleys.

The invention is hereinafter described with reference to the accompanying drawings, in which:

Figure 3 is a side elevation taken in the direction of the arrow 3 in Figure 2; and Figure 4 is a side elevation taken in the direction of the arrow 4 in Figure 2.

Figure 1:
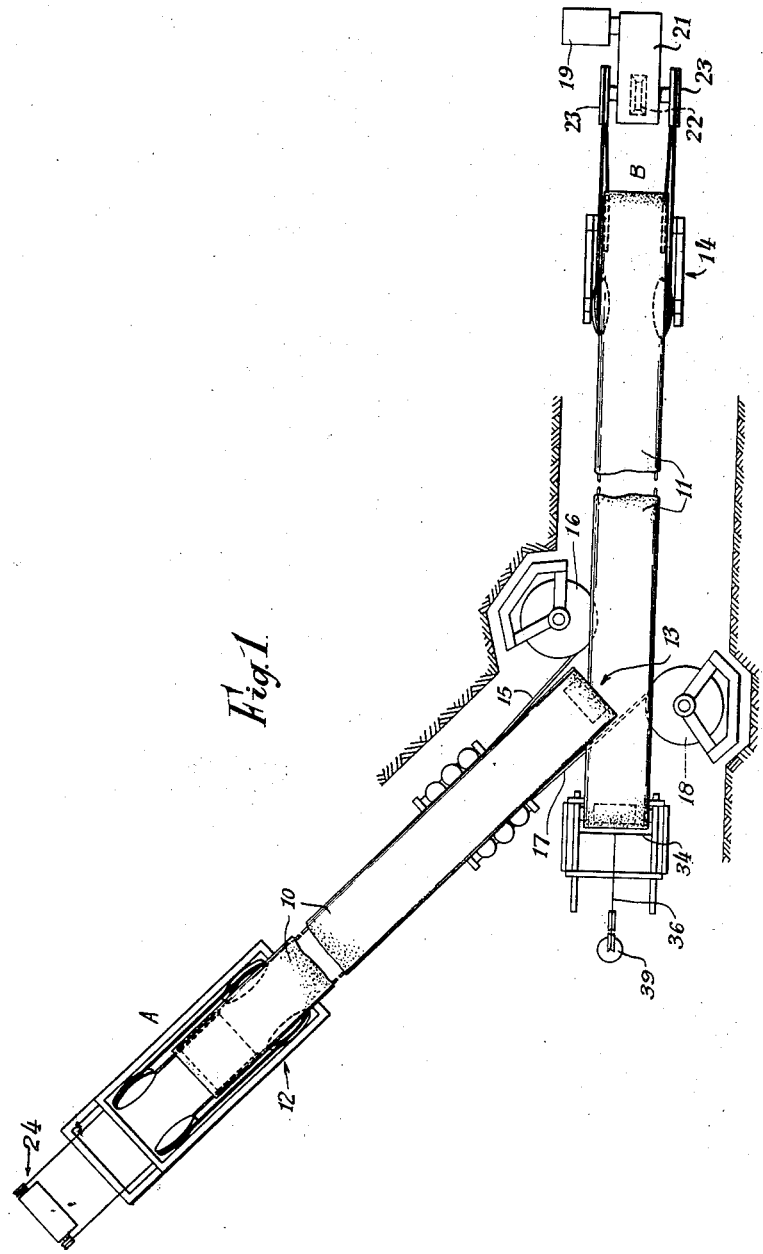
Figure 1 is a diagrammatic plan view of a conveyor embodying the present invention.

Referring to Figure 1 of the drawings, the conveyor is set up to carry material from a loading point A to a delivery point B which cannot be conveniently connected by a conveyor running in a straight line. Such a condition may arise in a mine, where material has to be conveyed from a point in one gallery or passage to a point in another gallery or passage which intersects the first, or in a surface installation where an obstruction lies in the direct line between the two points. The conveyor comprises two endless belts 10 and 11, the belt 10 extending from a tail unit 12 at A to a meeting place 13, and the belt 11 extending from the meeting place to a head unit 14 at B. Two cable circuits, one on each side of the line of the conveyor, run from the tail unit 12 to the head unit 14, one circuit consisting of a cable 15 the upper and lower runs of which are deflected from the direction of the belt 10 to the direction of the belt 11 by bend pulleys one of which is shown at 16, whilst the other circuit consists of a cable 17 the upper and lower runs of which are deflected from the direction of the belt 10 to the direction of the belt 11 by bend pulleys one of which is shown at 18.

The belts 10 and 11 have thickened zones at their edges, the said zones being grooved longitudinally to engage the cables, and the said cables, at the head and tail units 14 and 12 are looped about pulleys in such a manner that they are guided from positions in which they support one run of the belt to positions in which they support the other run of the belt, for example as described in U. S. Patent No. 2,751,065. The head unit 14 includes a driving motor 19 connected through a reduction gearbox 21 and a differential gear 22 to a pair of driving pulleys 23, 23 each driving one cable circuit. Cable tensioning means 24 are provided at the tail unit 12.

Figure 2:
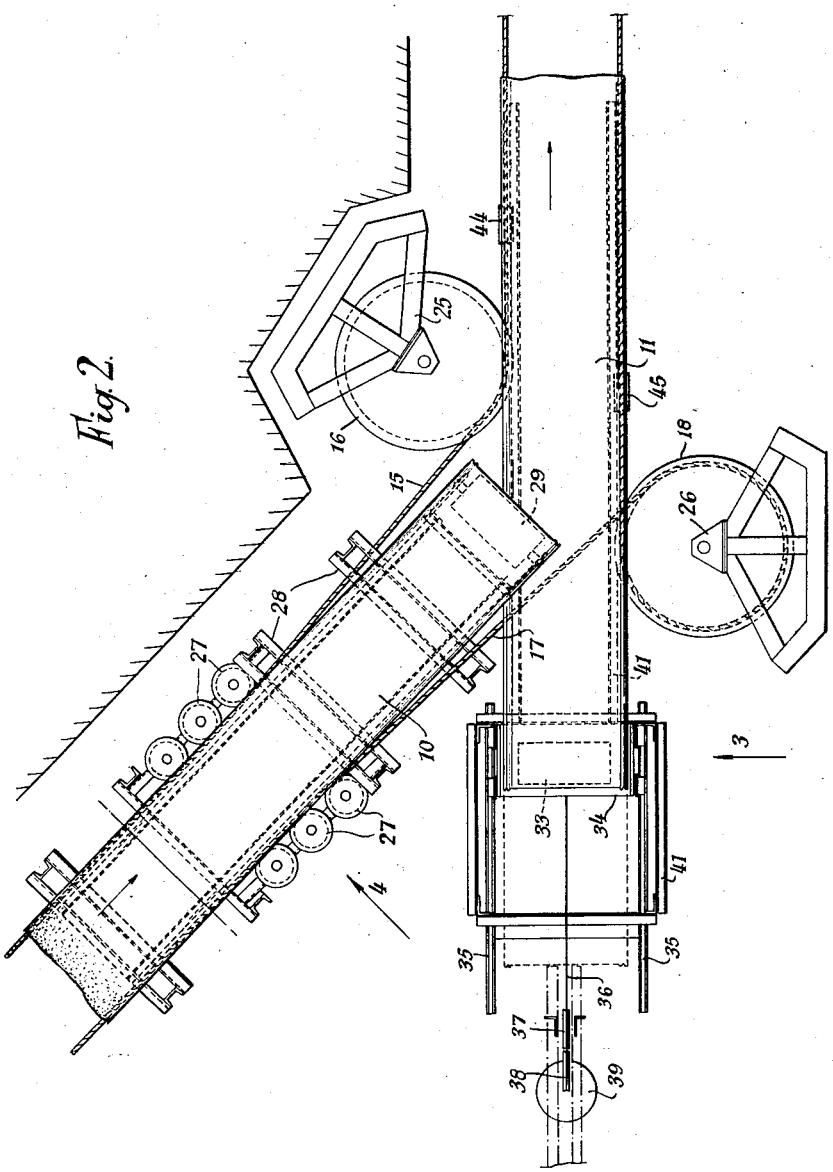
Figure 2 is a plan view, on a larger scale than Figure 1, showing only that part of the conveyor adjacent the meeting of the two sections.

Referring now to Figures 2, 3 and 4, the bend pulleys 16 and 18 are journalled in supports 25 and 26 respectively, in such positions that the parts of the cables 15 and 17 engaging the grooves in the belt 11 are tangential to their treads, and tangents to the said treads parallel to the centre line of the belt 10 are spaced apart by a distance greater than the width of that belt, the centres of both pairs of pulleys being so positioned that the said tangents lie between the said centres and the centre lines of the belts. From the points where they leave the pulleys 16 and 18, the cables 15 and 17 converge towards the centre line of the belt 10 and are deflected into parallelism with the said centre line, in positions to be received by the grooves in that belt, by guide pulleys 27.

The guide pulleys 27 are mounted on a frame 28 which also supports an end drum 29 for the belt 10 and upper and lower sets of idle rollers 31 and 32 respectively. The end drum 29 is positioned above the upper run of the belt 11 in such a position that material carried by the belt 10 is delivered over the drum on to the belt 11, and the idle rollers 31 and 32 support the belt between the end drum 29 and a point further from said end drum than the guide pulleys 27, the said rollers leading the belt upwardly away from the cables 15 and 17 on both the upper and lower runs.

The belt 11 extends past the end drum 29 for the belt 10 to an end drum 33 mounted on a wheeled carriage 34 running on rails 35 and having attached to it, by a cable 36 passing over pulleys 37 and 38, a weight 39 which acts to tension the belt 11. The rails 35 are fixed to a frame 41 carrying idle rollers 42 and 43 for supporting the end portions of the upper and lower runs of the belt 11, the rollers 42 and 43 deflecting the belt upwardly away from the cables 15 and 17, and the cables 15 and 17 being deflected downwardly over guide pulleys 44 and 45 which lead the said cables on to the bend pulleys 16 and 18.

As will be seen in Figure 2, each run of the cable 15 engages only a short arc of the treads of a bend pulley 16, on the side of said pulley nearer to the centre lines of the belts, but each run of the cable 17 engages a much longer arc of a bend pulley 18 on the side of said pulleys remote from the centre lines of the belts, each run of the cable 17 crossing itself on the inner side of the pulley 18 which it engages.

The angle between the belts 10 and 11 may be greater or less than that shown in the drawing, and the direction of one belt may be at right angles to that of the other. The conveyor sections may be inclined one to the other in a vertical direction as well as having their centre lines in different vertical planes.

Material placed on the belt 10 at the loading point A is carried by that belt to the meeting place, where it is transferred to the belt 11, the belt 11 carrying it to the delivery point B.

I claim:

1. A conveyor system comprising first and second endless conveyor belts to convey material respectively from a loading point to a junction point and from the junction point to a delivery point, said belts running in directions bearing an angular relationship in a horizontal plane, one to the other, cable means supporting both the upper and lower runs of said belts at their edges, and driving means acting on said cables to transmit movement to said belts, the cable means comprising one cable circuit supporting one edge of the first belt and one edge of the second belt and another cable circuit supporting the other edge of the first belt and the other edge of the second belt, deflecting means for both the runs of both said cable circuits at the junction point, and additional belt supporting means for both belts in the region of the junction point supporting said belt independently of the cable circuits along portions thereof extending from their adjacent ends.

2. A conveyor system comprising first and second endless conveyor belts to convey material respectively from a loading point to a junction point and from the junction point to a delivery point, said belts running in directions bearing an angular relationship in a horizontal plane, one to the other, cable means supporting both the upper and lower runs of said belts at their edges, and driving means acting on said cables to transmit movement to said belts, the cable means comprising one cable circuit supporting one edge of the first belt and one edge of the second belt and another cable circuit supporting the other edge of the first belt and the other edge of the second belt, a first pair of co-axial pulleys mounted on a substantially vertical shaft on one side of the second belt adjacent the junction point, a second pair of co-axial pulleys mounted on a substantially vertical shaft on the other side of the second belt adjacent the junction point, fixed structures supporting said shafts, the upper and lower runs of one cable circuit passing respectively around the pulleys of one pair and the upper and lower runs of the other cable circuit passing respectively around the pulleys of the other pair, said pulley pairs being so spaced that the parts of the cable circuits extending alongside the first belt leave them with a spacing greater than the width of the belt, additional guide means at the sides of said belt causing said parts of the cable circuits to converge and become parallel in their belt-supporting relation one to the other, and additional belt-supporting means for both belts in the region of the junction point supporting said belts independently of the cable circuits along portions thereof extending from their adjacent ends.

3. A conveyor system as claimed in claim 2, the additional supporting means comprising rollers engaging the undersides of the belts.

References Cited in the file of this patent
UNITED STATES PATENTS

| | | |
|---|---|---|
| 2,747,726 | Robins | May 29, 1956 |
| 2,751,065 | Thomson | June 19, 1956 |

FOREIGN PATENTS

| | | |
|---|---|---|
| 628,363 | Great Britain | Aug. 26, 1949 |